R. D. BROWN.
STALK-PULLER.

No. 182,350.    Patented Sept. 19, 1876.

WITNESSES:
H. Rydquist
John Goethals

INVENTOR:
Robert D. Brown
BY
   Munn
ATTORNEYS.

UNITED STATES PATENT OFFICE.

ROBERT D. BROWN, OF AUSTIN, TEXAS.

IMPROVEMENT IN STALK-PULLERS.

Specification forming part of Letters Patent No. 182,350, dated September 19, 1876; application filed April 18, 1876.

*To all whom it may concern:*

Figure 1:
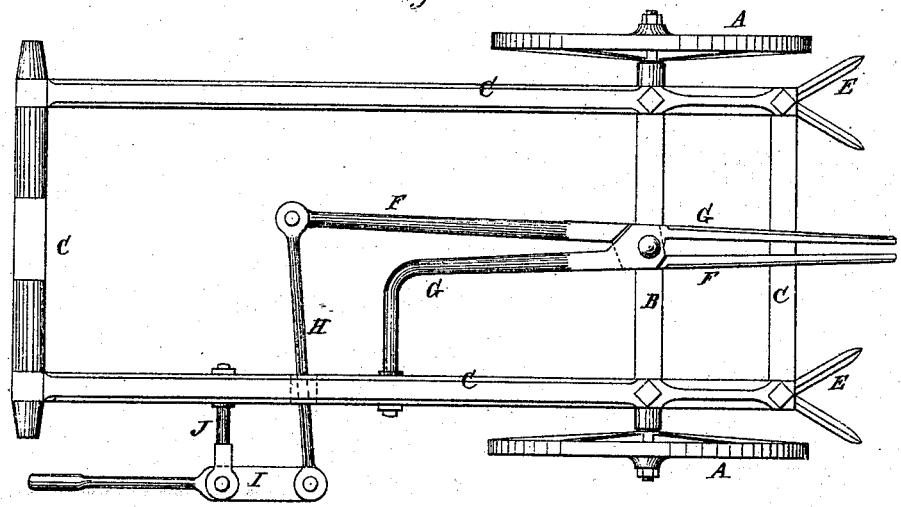
Figure 2:
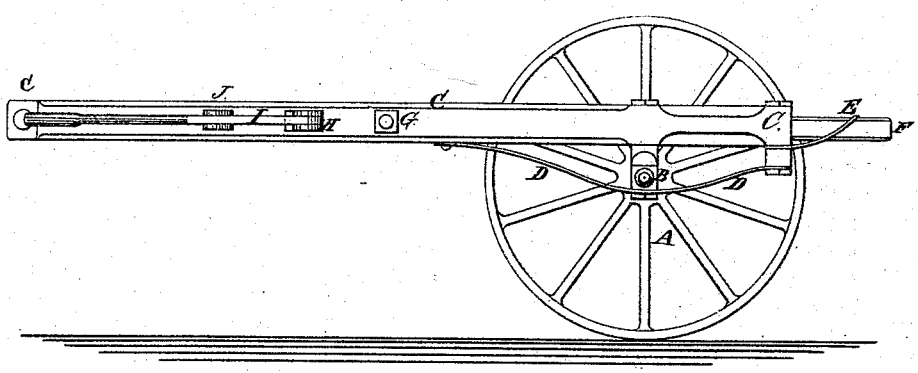

Be it known that I, ROBERT D. BROWN, of Austin, in the county of Travis and State of Texas, have invented a new and useful Improvement in Stalk-Puller, of which the following is a specification:

Figure 1 is a top view of my improved machine. Fig. 2 is a side view of the same.

Similar letters of reference indicate corresponding parts.

The special object of this invention is to furnish an improved machine for pulling cotton-stalks in preparing the land for another crop, which shall be simple in construction, convenient in use, and effective in operation.

A are the two wheels which revolve upon the journals of the axle B. C is a frame, consisting of two side bars connected at their ends by cross-bars, and which is attached, near its forward end, to the axle B, the rear cross-bar serving as a handle in operating the machine. F G are two jaws, the forward ends of which project in front of the forward cross-bar of the frame C, and which cross and are pivoted to each other and to the axle B at their point of intersection. The inner end or shank of one of the jaws, as G, is bent at right angles, and is attached to one of the side bars of the frame C. To the inner end or shank of the other jaw, F, is pivoted the end of a rod, H, which passes through and slides in a hole in the side bar of the frame C, and to its outer end is pivoted the end of a lever, I, which is pivoted to a horizontal stud, J, attached to the said side bar of the frame C. The rear end of the lever I projects into such a position that it may be conveniently reached and operated by the person operating the machine.

The machine is strengthened by the braces D, which pass beneath, and are attached to the axle B, and the ends of which are attached to the side bars of the frame C. To the forward cross-bar of the frame C are attached two or more forked or V-shaped knives or cutters, E, for cutting weeds when required.

In using the machine, the operator takes hold of the rear cross-bar of the frame C and pushes it forward to the stalks to be pulled. By moving the rear end of the lever I outward the jaws F G are opened to receive the stalks, and by moving the said end of the lever I inward the jaws F G are closed to grasp the stalks. Then, by bearing downward upon the rear end of the frame C, the stalks are pulled, the axle B acting as a fulcrum to the lever formed of the jaws F G and frame C.

Having thus described my invention, I claim as new and desire to secure by Letters Patent—

A stalk-puller formed of the wheels and axle A B, the frame C, the jaws F G, the connecting-rod H, and the lever I, constructed and operating in connection with each other, substantially as herein shown and described.

ROBERT D. BROWN.

Witnesses:
D. A. TODD,
J. M. DENTON.